United States Patent
Sztul et al.

(10) Patent No.: US 12,228,449 B2
(45) Date of Patent: Feb. 18, 2025

(54) SYSTEM AND METHOD FOR REAL-TIME LIGHT MAPPING

(71) Applicant: Bowery Farming Inc., New York, NY (US)

(72) Inventors: Henry Sztul, Larchmont, NY (US);
Charles Goodwin, Harrison, NJ (US);
Daniel Spinosa, Brooklyn, NY (US)

(73) Assignee: BOWERY FARMING, INC., New York, NY (US)

( * ) Notice: Subject to any disclaimer, the term of this patent is extended or adjusted under 35 U.S.C. 154(b) by 193 days.

(21) Appl. No.: 17/707,742

(22) Filed: Mar. 29, 2022

(65) Prior Publication Data

US 2023/0122342 A1    Apr. 20, 2023

Related U.S. Application Data

(60) Provisional application No. 63/257,958, filed on Oct. 20, 2021.

(51) Int. Cl.
*G01J 1/42*    (2006.01)
*A01G 7/04*    (2006.01)
(Continued)

(52) U.S. Cl.
CPC ............ *G01J 1/4228* (2013.01); *A01G 7/045* (2013.01); *G01J 1/0403* (2013.01); *G01J 1/44* (2013.01); *G01J 2001/4247* (2013.01)

(58) Field of Classification Search
CPC .......... G01J 1/4228; G01J 1/0403; G01J 1/44; G01J 2001/4247; A01G 7/045;
(Continued)

(56) References Cited

U.S. PATENT DOCUMENTS

2015/0061505 A1*   3/2015  Asami .................. G01J 1/32
                                                                  315/152
2017/0071518 A1*   3/2017  Xavier Da Silveira ...............
                                                                  A61B 5/14552
(Continued)

OTHER PUBLICATIONS

Barbosa et al., "Comparison of Land, Water, and Energy Requirements of Lettuce Grown Using Hydroponic vs. Conventional Agricultural Methods" Int. J. Environ. Res. Public Health 12(6):6879-6891 (2015).
Mayo, "Population Growing but US Farm Acreage Declining" in Ag in the News, Economics, Educational Training, Farm Succession, General Agriculture, Workshop IFAS Extension (Mar. 4, 2016).
Nandi et al., "Techno-economic analysis of a transient plant-based platform for monoclonal antibody production" MABS 8(8):1456-1466 (2016).

*Primary Examiner* — Dominic J Bologna
*Assistant Examiner* — Carlos Perez-Guzman
(74) *Attorney, Agent, or Firm* — Medler Ferro; WOODHOUSE & MILLS PLLC

(57) ABSTRACT

Light mapping devices and systems for use in indoor or vertical farming are disclosed herein. In particular, a light detection device is provided that includes a plurality of light sensors configured for detecting light emitted from one or more light sources at distinct positions across a grow plane. The light detection device will also include a microcontroller and one or more signal routing circuit boards, or junctions, for making electrical connections between the light sensors and the microcontroller in a multiplex architecture to enable the microcontroller to cycle through and read the Lux values from each of the light sensors with sub-second frequency and in real-time. The light detection device may also be part of a light mapping system that converts the Lux values to PPFD and generates a heatmap of PPFD intensity at distinct locations across the grow plane. Also provided herein are methods of using the light detector device and/or the light mapping system to determine the PPFD distribution across a grow plane in 2-dimensions or 3-dimensions in order to adjust the lights and/or position of (Continued)

growing plants, if necessary, to ensure that each plant in the grow bed receives sufficient light for optimal growth.

24 Claims, 9 Drawing Sheets

(51) Int. Cl.
*G01J 1/04* (2006.01)
*G01J 1/44* (2006.01)

(58) Field of Classification Search
CPC ... A01G 7/04; A01G 7/00; A01G 9/00; H05B 47/11; G01G 9/24; G01G 9/249
See application file for complete search history.

(56) References Cited

U.S. PATENT DOCUMENTS

| | | | |
|---|---|---|---|
| 2017/0099790 A1* | 4/2017 | Gonyer | H05B 47/11 |
| 2017/0215252 A1* | 7/2017 | Wells | A01G 9/20 |
| 2018/0317398 A1* | 11/2018 | Wells | H05B 45/50 |
| 2019/0261574 A1* | 8/2019 | Tomasovics | F21V 23/0471 |

* cited by examiner

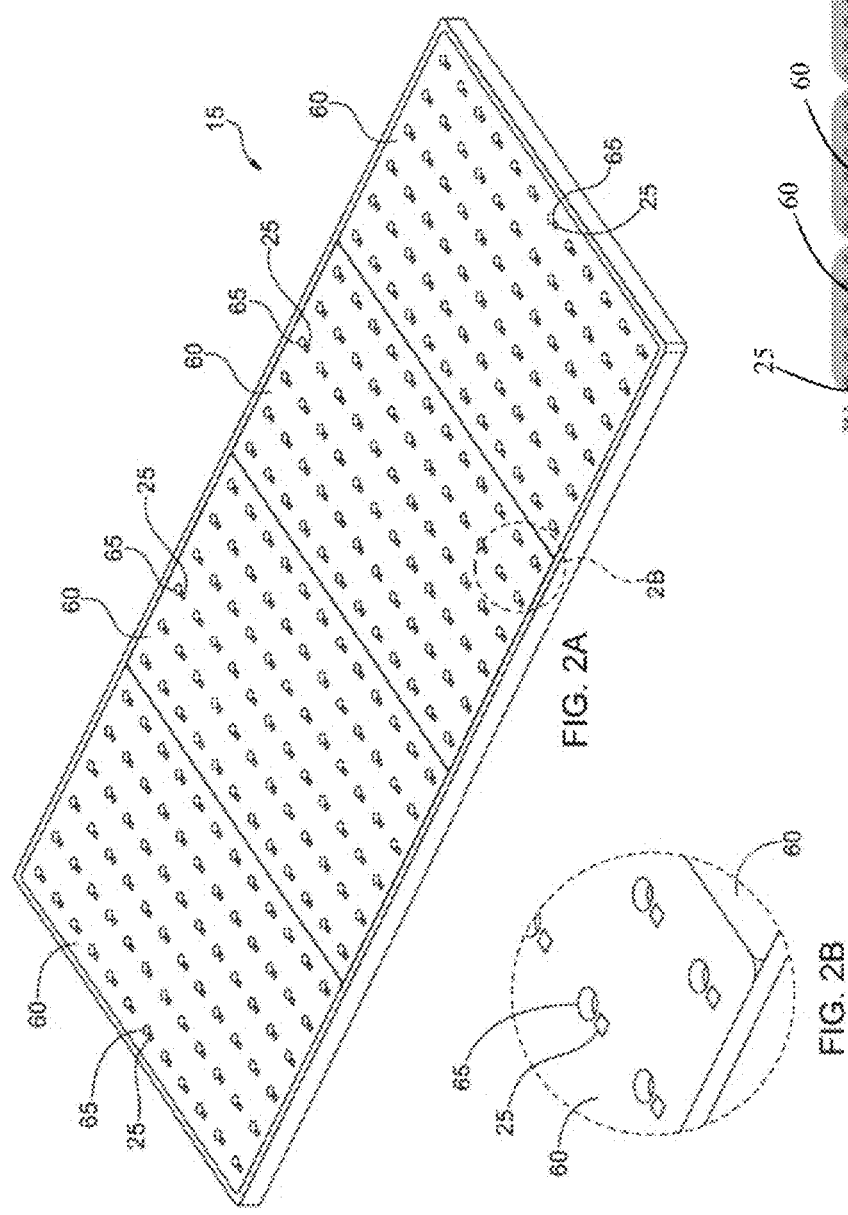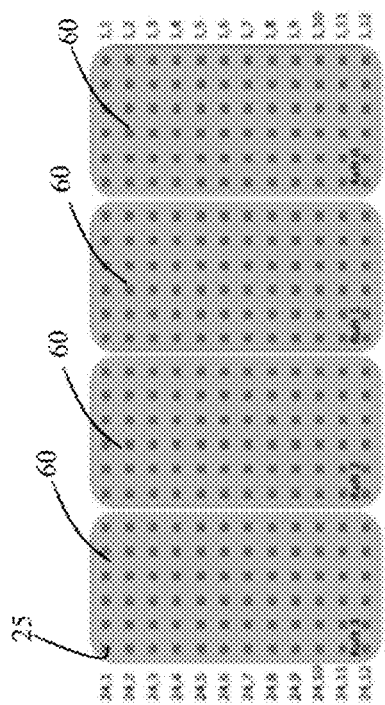

SYSTEM AND METHOD FOR REAL-TIME LIGHT MAPPING

CROSS REFERENCE TO RELATED APPLICATIONS

This claims the benefit of U.S. Provisional Application No. 63/257,958, filed Oct. 20, 2021, the entire content of which is incorporated by reference herein.

FIELD OF THE INVENTION

The present invention relates generally to methods and devices for measuring the amount of light emitted from one or more light sources to be delivered to growing plants. In particular, described herein is a device for real-time measurement and recording of light maps in both 2-dimensions and 3-dimensions.

BACKGROUND OF THE INVENTION

With increasing population and decreasing available farmland, the need for efficient farming is more important than ever. According to the U.S. Census Bureau, the world population is projected to increase to 9 billion by 2044, while farmland acreage will continuously decline [Mayo, "Population Growing but US Farm Acreage Declining" in Ag in the News, Economics, Educational Training, Farm Succession, General Agriculture, Workshop IFAS Extension (Mar. 4, 2016)]. In response, indoor crop production methods, such as vertical indoor farming, are on the rise. Indeed, the main goal of vertical farming is to efficiently produce crops in a reduced space, while simultaneously reducing the amount of water and other resources needed to maintain the crops. In addition to indoor farming, another growing indoor plant industry is plant-based hydroponic farming employed by biopharmaceutical drug producers. This industry has grown by 24% in recent years, generating over $392 million in the United States [Nandi et al., "Techno-economic analysis of a transient plant-based platform for monoclonal antibody production" MABS 8(8):1456-1466 (2016); Barbosa et al., "Comparison of Land, Water, and Energy Requirements of Lettuce Grown Using Hydroponic vs. Conventional Agricultural Methods" Int. J. Environ. Res. Public Health 12(6):6879-6891 (2015)].

Growing plants indoors in the absence of direct sunlight requires the grower to provide a suitable light source to activate the light-dependent step of the plant's photosynthetic process. Further, the amount of light delivered to plants growing indoors can be directly correlated to the plants' mass at the time of harvest. However, variation in light intensity is observed between different grow locations in an indoor farm and/or from grow to grow, which is due, in part, to different intensity of grow lights or differences in grow light positions relative to the plants. Additionally, variations in light intensity at different points across the plant canopy have been observed to cause differences in plant sizes within individual plots or grow positions in an indoor farm. For instance, plants grown at the edge of a grow plane have sometimes been observed to grow to half the size of the plants grown in the middle of the same grow plane. Therefore, a very important factor in maximizing plant growth is the ability to identify those areas within a grow plant that have varying luminance and properly adjusting grow light conditions to optimize luminance uniformity across the grow plane as plants grow.

Unfortunately, mapping the distribution of luminance under grow light fixtures is a time-consuming process that requires the grower to take many single point luminance measurements from many different locations in a grow plane using an art-standard photosynthetically active radiation (PAR) meter or similar hand-held light sensor. The single-point measurements would then have to be combined to provide an accurate light intensity map across the plane of measurement. This presents a substantial obstacle to obtaining real-time and accurate light intensity distribution maps across a plant canopy since the single-point measurement process is very time consuming and has practical limitations on the number of points that can be measured by hand. Since increasing the number of point measurements increases the accuracy of the light intensity distribution map of the grow plane, hand-held PAR measuring techniques, and other similar techniques currently being used in the art, are not capable of high accuracy, high speed light mapping. In turn, without an accurate light intensity distribution map, the grow light positions and/or plant grow positions cannot be properly adjusted to optimize light distribution and growth efficiency.

Thus, there remains a need in the art for devices and methods for taking rapid, real-time light intensity measurements over an entire grow plane and develop light intensity distribution maps to enable proper light and/or grow position adjustments for optimizing growth of the plants.

SUMMARY OF THE INVENTION

Described herein is a novel and innovative device and system capable of sub-second frequency, real-time light intensity distribution mapping (or light mapping) of a grow plane (e.g., plants grown in a vertical or other indoor farm). In particular, a light detection device is disclosed that may include an array of photocells or light sensors capable of detecting light across a wide spectrum of visible and infrared spectral wavelengths, one or more circuit junctions, a multiplexer, and a microcontroller—all electrically connected in a multiplex architecture. Further, the device may be configured for wireless communication through a wireless network, such as a cloud-based network, for storing measurement data in a database and communicating with a computing device/server running software for converting Lux values to photosynthetic photon flux density ("PPFD") in real time and displaying a luminance intensity distribution map of the grow plane. The user can use the luminance intensity distribution map to determine how to adjust the grow position of the plants and/or the grow light position to optimize light distribution to the growing plants and, ultimately, optimize the yield of the plants.

One aspect of the invention features a light detection system that includes a light detection device in communication with a first computing device. The light detection device includes a support member with a top surface on which is disposed a plurality of light sensors, each of which is electronically connected to a controller, such as a microcontroller. Each light sensor has a location position and is configured for detection of luminance within a grow plane that is emitted from one or more light sources. The luminance includes light having a spectral wavelength in the range from about 100 nm to about 1,200 nm, and the light sensors detect the luminance as a first light value. The controller is configured to read the first light value and the location position from each of the light sensors at less than about a 2 Hz sampling rate for the entire plurality of light sensors. The controller combines the first light value and location position from each of the light sensors on a single data string and sends the single data string to the first computing device. The first computing device then runs an application that converts the first light value from each of the light sensors to a second light value and arranges the second light values by location positions of the light sensors in at least 2-dimensions. In some aspects, each light sensor comprises a photodiode. In addition, the light detection device may include a transparent cover disposed over the plurality of light sensors.

In another embodiment, the controller is further configured to read the first light value and location position from the plurality of light sensors at less than about a 1 Hz sampling rate (i.e., sub-second frequency). In yet another embodiment, the first computing device is a cloud-based server running the application. The system may also include a second computing device with a graphic user interface and which receives instructions from the application to display a heatmap comprising the second light values. The system may further include one or more databases in communication with the controller and the first computing device. These databas(es) are configured for storing the second light values arranged by location positions of the light sensors in at least 2-dimensions. In some embodiments, the location positions of each of the light sensors comprises an x-position and a y-position.

In another embodiment, it may be desirable to measure luminance intensity at varying distances from the grow lights (i.e., on the z-axis). Thus, the light detection device may include one or more height adjustment members attached to the bottom surface of the support member and configured for adjusting the height of the light detection device from a first height position to a second height position. Further, the locations positions of each of the light sensors may include an x-position, a y-position, and a z-position, which enables the application of the first computing device to arrange the second light values by location positions of the light sensors in 3-dimensions.

In one embodiment, the first light value is Lux. In another embodiment, the second light value is photosynthetic photon flux density ("PPFD"), and the application converts the Lux values from each light sensor to PPFD according to equations PPFD=m*Lux+$\beta$ and/or PPFD=Lux*$\alpha$+$\beta$. In another embodiment, the light detection device includes at least 100 light sensors disposed on the top surface of the support member. In another embodiment, the light detection device includes at least 288 light sensors disposed on the top surface of the support member. For instance, the light detection device may include at least 288 light sensors arranged in 24 columns of 12 light sensors.

In another embodiment, the light detection device includes one or more signal routing circuits, each of which is electrically connected to a portion of the plurality of the light sensors and further electrically connected to an input on the controller. In some aspects, the light detection device includes a multiplexer electrically connected to each of the signal routing circuits and electrically connected to the controller.

In one embodiment, the light detection device includes at least two signal routing circuits, wherein the support member comprises at least two Rafts, and wherein each Raft comprises at least one of the signal routing circuits. Alternatively, the light detection device may include at least four signal routing circuits, wherein the support member comprises at least four Rafts, and wherein each Raft comprises at least one of the signal routing circuits.

In another embodiment, the one or more light sources are grow lights. In yet another embodiment, each light sensor is configured for detection of luminance within a grow plane, the luminance comprising light having a spectral wavelength from about 300 nm to about 700 nm. In other embodiments, the grow plane is one in which plants will be grown, such as, but not limited to asparagus, barley, beans, beets, blueberries, broccoli, cabbage, canola, cauliflower, celery, cranberries, corn, cotton, feed grains, flowers, garlic, grapes, lentils, lettuce, marijuana, oats, peanuts, peas, peppers, potatoes, pumpkins, rice, sorghum, soybeans, spinach, squash, strawberries, sugar cane, sweet potatoes, tobacco, tomatoes, turnips, watermelon, wheat, or any combination thereof.

Another aspect of the invention features a method of measuring luminance intensity within a grow plane. The method includes the steps of: (a) providing a grow plane in which plants are currently being grown or that will be grown with at least one light source in a first position that emits light to the grow plane; (b) providing the light detection system described above; (c) placing the light detection system's light detection device within the grow plane with the top surface of the support member facing the at least one light source; and (d) measuring luminance distribution in the grow plane to produce a heatmap of luminance intensity distribution across the grow plane in at least 2-dimensions.

In another embodiment, the method includes the step of moving the at least one light source from the first position to a second position, wherein the at least one light source in the second position emits light having a luminance distribution in the grow plane that is more evenly distributed than when the at least one light source is in the first position. Alternatively, the method may include determining positions in the grow plane with a first luminance intensity according to the heatmap and a second luminance intensity according to the heatmap, where the first luminance intensity is greater than the second luminance intensity. Accordingly, the method may include the step of placing the plants in the positions in the grow plane with the first luminance intensity.

In another embodiment, the method further includes the step of moving the light detection device to a different position along the z-axis and repeating the measuring step. In another embodiment, this additional step is repeated at least one time. In yet another embodiment, the measuring comprises a heatmap of luminance intensity distribution across the grow plane in 3-dimensions.

In yet other embodiments, the method includes plants that are selected from among asparagus, barley, beans, beets, blueberries, broccoli, cabbage, canola, cauliflower, celery, cranberries, corn, cotton, feed grains, flowers, garlic, grapes, lentils, lettuce, marijuana, oats, peanuts, peas, peppers, potatoes, pumpkins, rice, sorghum, soybeans, spinach, squash, strawberries, sugar cane, sweet potatoes, tobacco, tomatoes, turnips, watermelon, wheat, or any combination thereof. The grow plane may also be part of an indoor farm, such as, but not limited to, a vertical farm.

In other aspects of the invention, a light detection device is featured that includes a support member with a top surface and a bottom surface, a plurality of light sensors disposed on the top surface of the support member, a multiplexer, a microcontroller, and two or more signal routing circuits, each of which is electrically connected to a portion of the plurality of the light sensors and further electrically connected to the multiplexer. In this aspect, the multiplexer is electrically connected to each of the signal routing circuits and electrically connected to the microcontroller. Further, each light source comprises a location position and is configured for detection of luminance within a grow plane, the luminance including light having a spectral wavelength in the range from about 100 nm to about 1,200 nm that is emitted from one or more light sources. The light sensors detect the luminance as a first light value. The microcontroller is configured to read the first light value and the location position from each of the light sensors at a sampling rate of less than about 1 Hz for the plurality of light sensors. The microcontroller is further configured to combine the first light value and location position from each of the light sensors on a single data string and send the single data string to at least one computing device. In some embodiments, each light sensor comprises a photodiode. In other embodiments, the light detection device includes a transparent cover disposed over the plurality of light sensors.

In an embodiment, the at least one computing device includes an application for converting the first light value from each of the light sensors to a second light value, and arranging the second light values by location positions of the light sensors in at least 2-dimensions. The support member of the light detection device may include at least two Rafts, with each Raft including at least one signal routing circuit or, alternatively, the light detection device may include at least four Rafts, with each Raft including at least one signal routing circuit.

In some embodiments, the light detection device includes at least 288 light sensors arranged in 24 columns of 12 light sensors. In others, each light sensor is configured for detection of luminance within a grow plane, the luminance comprising light having a spectral wavelength from about 300 nm to about 700 nm.

In another embodiment, the at least one computing device is a cloud-based server running the application. Further, there may be a second computing device with a graphic user interface and which receives instructions from the application to display a heatmap comprising the second light values. In one embodiment, the location positions of each of the light sensors comprises an x-position and a y-position.

The light detection device may also include one or more height adjustment members attached to the bottom surface of the support member and configured for adjusting the height of the light detection device from a first height position to a second height position. Accordingly, in some embodiments, the locations positions of each of the light sensors comprises an x-position, a y-position, and a z-position.

In another aspect, the first light value is Lux. In yet other aspects, the second light value is photosynthetic photon flux density ("PPFD"), and the application converts the Lux values from each light sensor to PPFD according to equation(s) PPFD=m*Lux+β and/or PPFD=Lux*α+β.

Another aspect of the invention features a method of measuring luminance intensity within a grow plane that includes: (a) providing a grow plane in which plants are currently being grown or that will be grown, wherein at least one light source in a first position emits light to the grow plane; (b) providing the light detection device of the invention; (c) placing the light detection device within the grow plane with the top surface of the support member facing the at least one light source; and (d) measuring luminance distribution in the grow plane to produce a heatmap of luminance intensity distribution across the grow plane in at least 2-dimensions.

The method may include the step of moving the at least one light source from the first position to a second position when the at least one light source in the second position emits light having a luminance distribution in the grow plane that is more evenly distributed than when the at least one light source is in the first position. Alternatively, the method may include determining positions in the grow plane with a greater luminance intensity according to the heatmap, determining positions in the grow plane with a lesser luminance intensity according to the heatmap, and, optionally, placing the plants in the positions in the grow plane with the greater luminance intensity.

In another embodiment, the method includes the step of moving the light detection device to a different position along the z-axis and repeating the measuring step at least one time. In yet another embodiment, the measuring step includes a heatmap of luminance intensity distribution across the grow plane in 3-dimensions.

The method described herein may include plants, such as, but not limited to, asparagus, barley, beans, beets, blueberries, broccoli, cabbage, canola, cauliflower, celery, cranberries, corn, cotton, feed grains, flowers, garlic, grapes, lentils, lettuce, marijuana, oats, peanuts, peas, peppers, potatoes, pumpkins, rice, sorghum, soybeans, spinach, squash, strawberries, sugar cane, sweet potatoes, tobacco, tomatoes, turnips, watermelon, wheat, or any combination thereof. The method may include a grow plane that is part of an indoor farm, such as a vertical farm.

Other features and advantages of the invention will be apparent by reference to the drawings, detailed description, and examples that follow.

BRIEF DESCRIPTION OF THE DRAWINGS

FIGS. 2A-C depict an exemplary embodiment of a light detection device. FIG. 2A depicts the top perspective view of the light detection device, such that the light sensor array is visible.

FIG. 2B is an enlarged region of the light detection device.

FIG. 2C is a diagram of the exemplary light detection device depicting the x- and y-positions of the various light sensors. In this particular embodiment, there are 24 columns of light sensors, with each column containing 12 light sensors for a total of 288 light sensors. The upper right light sensor position is designated 1, 1, while the bottom left light sensor position is designated 24, 12. The light detection device includes four sections, or rafts labeled Raft 0, Raft 1, Raft 2, and Raft 3, positioned right to left.

FIG. 5B is a diagram of the ribbon connector breadboard and master control board connections in an exemplary embodiment of the multiplex architecture. The abbreviations are defined as follows: R, Raft; SCL, serial clock line; SDA, serial data line; C, common; SIG, Sig pin; S, switch or control pins; T, timers; A, analog; D, digital, Gnd, ground; Vin, voltage in.

DETAILED DESCRIPTION OF THE INVENTION

Figure 1:
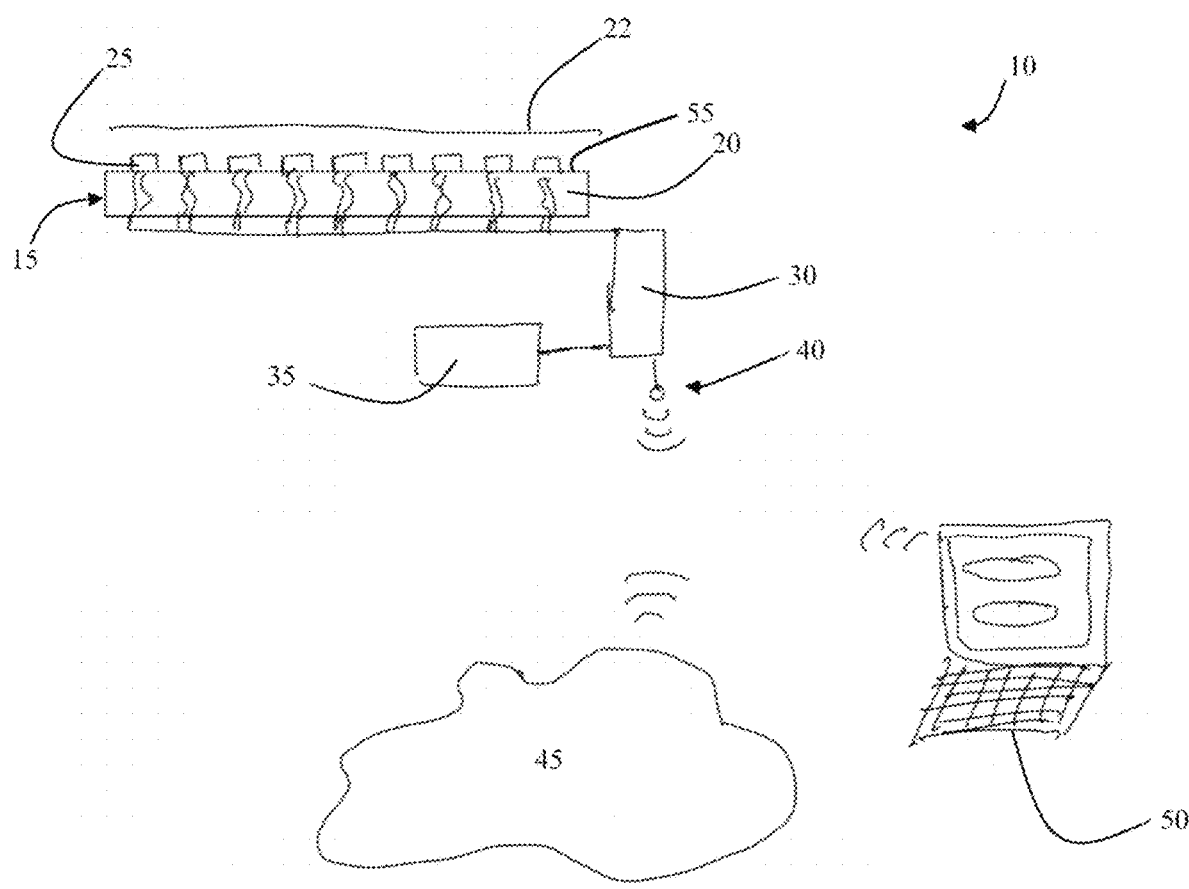
FIG. 1 is a diagram of an exemplary embodiment of a light mapping system.

Described herein is a novel light detection device and light mapping system for rapid, real-time detection of luminance across a grow plane and generation of luminance mapping data of the grow plane in 2-dimensions and/or 3-dimensions. The present light detection system is useful for measuring luminance intensity distribution emitted from one or more light sources, such as grow lights, being used to provide growing plants with a source of photons for photosynthesis in an indoor farm or vertical farm. The present light detection system is capable of measuring luminance at a plurality of distinct points within a grow plane with sub-second frequency. In this way, the luminance across many distinct points can be displayed as a heat map in real-time.

The inventors have developed a light detection device on which is disposed a plurality of light sensors configured in an ordered array, with each light sensor being electronically connected to a microcontroller using a multiplex architecture. In this manner, the light detection device is capable of rapidly cycling through the entire series of light sensors with sub-sequence frequency. The luminance data (as Lux value) from a 2-dimensional grow plane or 3-dimensional grow pane or volume is sent to a computing device running a computer application for converting the Lux value to photosynthetic photon flux density ("PPFD") and generating a visual heatmap of the grow plane that displays the luminance intensity detected by each light sensor at a location x, y in the grow plane or, if measuring luminance in the z axis as well, each light sensor at a location x, y, and z.

The light detection device and light mapping system is especially useful in indoor farms where crops and other plants are grown in a plot exposed to light emitted from artificial light sources provided by the grower—as opposed to natural sunlight. In the absence of direct sunlight, such artificial light sources are necessary to facilitate photosynthesis in the plants. The light detection device of the present invention can be placed under the grow light source(s) within the grow plane where plants are currently being grown or that will be grown in order to generate a heatmap of luminance intensity across the entire grow plane. The user can then use the heatmap generated by the light mapping system for real-time visualization of inconsistent or nonuniform areas of light distribution within the grow plane and, either adjust the light sources themselves, or position/reposition the plants to optimize light absorption and growth of the plants. Thus, the present device and system provides an enormous advantage over prior art techniques that require single point readings of photosynthetically active radiation ("PAR") using a handheld detector that is not only extremely time consuming, but does not practically enable high accuracy readings across the grow plane.

The light detection device, light mapping system, and methods of use thereof will now be described in further detail.

Definitions

Unless defined otherwise, all technical and scientific terms used herein have the same meaning as those commonly understood by one of ordinary skill in the art to which this invention belongs. Standard techniques are used unless otherwise specified. Although methods and materials similar or equivalent to those described herein can be used in the practice or testing of the present disclosure, suitable methods and materials are described below. The materials, methods and examples are illustrative only, and are not intended to be limiting. All publications, patents and other documents mentioned herein are incorporated by reference in their entirety.

Ranges, if used, are used as shorthand to avoid having to list and describe each and every value within the range. Any value within the range can be selected, where appropriate, as the upper value, lower value, or the terminus of the range.

As used herein, the singular forms "a," "an," and "the" include the plural referents unless the context clearly indicates otherwise. Likewise, the terms "include", "including", and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "about" refers to the variation in the numerical value of a measurement, e.g., diameter, length, percentage, wavelength, etc., due to typical error rates of the device used to obtain that measure. In one embodiment, the term "about" means within 5% of the reported numerical value, preferably, the term "about" means within 3% of the reported numerical value.

The term "comprising" is intended to include embodiments encompassed by the terms "consisting essentially of" and "consisting of." Similarly, the term "consisting essentially of" is intended to include embodiments encompassed by the term "consisting of."

The term "grow bed" as used herein refers to a bed, bin, or other structure on which plants can be grown in an indoor or vertical farm. The "grow bed" will contain a sufficient amount of soil or water (i.e., hydroponics) in which the plants will be grown.

The term "grow plane" as used herein refers to a 2-dimensional plane across the surfaces of growing plants, such as the plant canopy. The "grow plane" may also be used herein to refer to a 3-dimensional space in which plants are growing or will be grown, especially when luminance measurements are taken along the z-axis.

The term "irradiance" as used herein refers to the amount of electromagnetic radiation reaching a surface, measured in Watt per square meter (W/m$^2$).

The term "lumen" as used herein refers to the amount of light emitted by a light source.

The term "luminance" as used herein refers to a photometric measure of the lumen intensity per unit area of light traveling in a given direction. "Luminance" can be measured in candela per square meter (cd/m$^2$).

The term "Lux" as used herein refers to a unit of illuminance that is equal to one lumen per square meter.

The terms "PAR" and "photosynthetically active radiation" are used interchangeably herein to refer to the spectral range of solar radiation or light that photosynthetic organisms are able to use in the process of photosynthesis. PAR light typically has a spectral wavelength ranging from about 300 nm to about 700 nm; preferably, from about 380 nm to about 700 nm.

The terms "PPFD" or "photosynthetic photon flux density" are used interchangeably herein to refer to both the intensity and amount or number of photons in the PAR spectral wavelength range that are being applied to a surface, such as a plant canopy, per second. "PPFD" is commonly measured in μmol/m$^2$/s.

The term "plant canopy" is used herein to refer to the aboveground portion of a plant or crop, formed by the collection of individual plant stems, leaves, flowers, and other crown structures that grow outward in three dimensions.

The term "real time" is used herein to refer to a cycling rate of less than about 2 Hz (preferably, sub-second frequency less than about 1 Hz) for the light detection device to measure the Lux from each of the light sensors disposed on its support member or chassis.

The Light Detection Device

The light detection device of the present disclosure is capable of rapidly measuring the luminance intensity being emitted from one or more light sources distributed across a plant grow plane, such as a plant canopy, in real-time. In some embodiments, the grow plane is in the x- and y-axes, or in 2-dimensions. The light intensity is initially measured in Lux, which may then be converted to PPFD and displayed as a heat map showing the luminance intensity distribution across an x and y 2-dimensional grow plane. In another embodiment, the grow plane (or grow area) is in the x-, y-, and z-axes, or in 3-dimensions, and the heat map shows the luminance intensity distribution across an x, y, and z 3-dimension grow area. The heatmap, in turn, provides luminance intensity distribution information to the user of the device for determining what adjustments need to be made to the position or intensity of the light sources or the position of the plants being grown in relation to the light sources in order to ensure uniform distribution of light to the plants. Ensuring uniform distribution of light across a plant canopy can optimize plant growth in an indoor farm.

The light detection device may include a support member or chassis on which is disposed a plurality of light sensing devices or light sensors. While light sensors capable of detecting light across spectral wavelengths ranging anywhere from about 100 nm to about 1,200 nm are suitable for use with the light detection device, it is preferable that the light sensors will be capable of at least detecting light with spectral wavelengths suitable for utilization by plants for photosynthesis. Therefore, in a preferred embodiment, the light sensors will be capable of detecting at least the light across the PAR spectrum, which is light having a spectral wavelength from about 300 nm to about 700 nm, e.g., 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, or 700 nm. Preferably, the light sensors will detect light having a spectral wavelength of from about 400 nm to about 700 nm.

Each light sensor will detect light at a particular point within the grow plane (e.g., having both x- and y-coordinates if measuring luminance intensity in a 2-dimensional grow plane; or having x-, y-, and z-coordinates if measuring luminance intensity in a 3-dimensional grow plane or area). As one having ordinary skill in the art will appreciate, increasing the number of light sensors used to measure the luminance intensity across a grow plane or area will tend to increase the accuracy of the heatmap generated. In one embodiment, the light detection device may include at least one light sensor, e.g., 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 400, 500, 600, 700, 800, 900, 1,000, or more light sensors disposed on the surface of the support member or chassis that will face the light emitters or sources (e.g., typically, this is the top surface of the light detection device). As noted above, the more points that are measured within the grow plane, the higher the accuracy of the light distribution heat map will be. Therefore, it is desirable that the light detection device include a plurality of light sensors assembled in an array. For instance, in one embodiment, the light detection device may include at least 10 light sensors arranged in an array, or at least 20 light sensors arranged in an array, or at least 50 light sensors arranged in an array, or at least 100 light sensors arranged in an array; more preferably, the light detection device will include at least 200 light sensors; even more preferably, the light detection device will include at least 250 light sensors. In a particular embodiment, the light detection device will have 288 light sensors disposed on the top surface of the support member or chassis. The light sensors can be evenly distributed across the top surface of the light detection device such that each light sensor can be assigned an x-coordinate and a y-coordinate for constructing a heatmap as will be discussed in additional detail elsewhere herein. The light sensors can be affixed to the surface of the support member or chassis by any suitable means, such as, but not limited to, solder, adhesive, screws, nails, and the like.

The number of light sensors that can be disposed on the support member or chassis will depend, in part, on the length and width, or surface area, of the support member. Thus, in one embodiment, the support member or chassis has dimensions that include a length of at least about 1 ft (about 30.5 cm), e.g., 1 ft, 1.5 ft, 2 ft, 2.5 ft, 3 ft, 3.5 ft, 4 ft, 4.5 ft, 5 ft, 5.5 ft, 6 ft, 6.5 ft, 7 ft, 7.5 ft, 8 ft, 8.5 ft, 9 ft, 9.5 ft, 10 ft, or more; and a width of at least about 1 ft (about 30.5 cm), e.g., 1 ft, 1.5 ft, 2 ft, 2.5 ft, 3 ft, 3.5 ft, 4 ft, 4.5 ft, 5 ft, 5.5 ft, 6 ft, 6.5 ft, 7 ft, 7.5 ft, 8 ft, 8.5 ft, 9 ft, 9.5 ft, 10 ft, or more. In a preferred embodiment, the length of the support member or chassis is at least about 5 ft (about 1.5 m), and the width of the support member is at least about 2.5 ft (about 0.75 m). In a more preferred embodiment, the support member or chassis has the dimensions of at least about 8 ft (about 2.4 m) in length and at least about 4 ft (about 1.2 m) in width. For instance, in the exemplary embodiment depicted in FIGS. 2 and 3, the wire chassis (support member) of the light detection device is about 4 ft wide by about 8 ft long. The support member or chassis can be made of any material. Preferably, however, the material will be durable, but light weight (e.g., less than about 300 lbs/ft$^3$ (about 4,805 kg/m$^3$); preferably, less than about 200 lbs/ft$^3$ (about 4,805 kg/m$^3$); more preferably, less than about 50 lbs/ft$^3$ (about 800 kg/m$^3$), such as, but not limited to, aluminum, wood, plastic, Styrofoam, polyvinyl chloride, and the like. The support member or chassis of the light detection device can be made from a single piece of material, or it can be assembled from smaller sections of material. For instance, in the exemplary embodiment depicted below, the support member or chassis is made from assembling four substantially equal-sized sections of Styrofoam.

Light sensors suitable for detecting light, especially visible or PAR light, are available in the art and include, but are not limited to, photoresistors, photodiodes, phototransistors, photoconductors, photo-emissive cells, photovoltaic cells, photo-junction devices and the like. In one particular embodiment, the lights sensors include photodiodes, which function by absorbing photons and converting the photons to electrical signal. Suitable photodiode light sensors are available in the art, such as the TSL2561 Luminosity Sensors (Adafruit Industries, New York, New York, USA).

In some embodiments, the light detection device will include a transparent, protective cover/film or coating disposed on the top surface of the support member or chassis in order to protect the light sensors from dirt and/or damage. Preferably, the protective film will be thin and flexible, such as polyurethane, polyvinylidene chloride, polyethylene, or poly (methyl methacrylate).

The light detection device will also include a controller in electrical communication with each of the light sensors and configured to provide power to the plurality of light sensors, control the functionality of the lights sensors, and read the luminance values detected by the plurality of light sensors. A typical controller suitable for use herein may be a microcontroller, which is a compressed microcomputer on a single chip that contains one or more central processing units along with memory and programmable input/output peripherals, and which are used in automatically controlled devices. The luminance or lumens detected by the light sensors is typically measured in units of Lux. The present microcontroller will also preferably have wireless capability configured for communicating with one or more databases and/or computing devices via a network, such as a cloud-based network. Other exemplary networks may include some combination of a local area network, a Bluetooth network, a cellular or mobile network, and/or the Internet. As one having ordinary skill in the art will appreciate, microcontrollers can be modified for wireless capability (e.g., IoT or Internet of Things) using art-standard software and/or art-standard components, whereas other microcontrollers are available with built-in wireless capability. The microcontroller of the present disclosure allows for the light detection device to cycle through each of the light sensors in real time with sub-second frequency in order to send the Lux data and corresponding coordinates (i.e., x, y, Lux) to a computing device running an application (i.e., a software program) that can convert the Lux values into PPFD and, ultimately, the heatmap of the grow plane.

Typically, microcontrollers have limited input/output, or i/o channels. Therefore, a light detection device with many light sensors, such as the exemplary embodiment depicted in FIGS. 2-6 below, which has 288 light sensors, will also include one or more signal routing circuit boards, or junctions. The purpose of the junctions is to enable a microcontroller with limited i/o channels to cycle through and read Lux data from many light sensors. In a preferred embodiment, the light detection device will include a plurality of junctions, e.g., 2, 3, 4, 5, 6, 7, or more junctions. Each of the junctions will be electronically connected to a portion of the total number of light sensors on the light detection device. For instance, the surface of the light detection device can be divided into equal sections, or Rafts, each of which includes a single junction. The junctions may be disposed on an art-standard breadboard, which is then attached to the bottom surface of the support member or chassis by any suitable means (e.g., solder, adhesive, nails, screws, and the like). The light sensors on each of these sections can be electronically connected to the corresponding junction on that section. The junctions, in turn, are electronically connected to the microcontroller, either each directly, or as a series (i.e., each junction is electronically connected to the next junction, with the last junction being connected to the microcontroller). The means for electronically connecting the light sensors, junctions, and microcontrollers with wires are well within the purview of the skilled artisan and will not be described in further detail. In some embodiments, each light sensor on the top surface of the support member or chassis is adjacent to a bore or hole in the support member or chassis through which wires connect the light sensors to the junctions, which are attached to the bottom surface of the support member or chassis.

It may also be desirable to include a multiplex junction or multiplexer, to which each of the junctions are electronically connected. In such an embodiment, the multiplex junction is then electronically connected to the microcontroller. Multiplexers or "mux" are electronic devices used to take multiple inputs and select or choose which one of the inputs is passed through to the output of the device at a given time. A multiplexer can be as simple as having two inputs, one output, and one select line. An exemplary multiplexer suitable for use with the present invention has 8-16 inputs (or channels) and four outputs and is available in the art (e.g., SparkFun Analog/Digital MUX Breakout CD74HC4067, SparkFun Electronics, Niwot, Colorado, USA).

Multiplexers are used to help improve the amount of data throughput in digital systems, as they are efficient at handling large quantities of data traffic. Therefore, in a preferred embodiment, the support member or chassis of the light detection device is divided into equal sections, with each section including a junction to which all light sensors in that section are electronically connected, with each junction electronically connected to a multiplexer (either directly or in a series) for connecting to the i/o channels of the microcontroller. Thus, the multiplexing architecture enables the light detection device to rapidly cycle through each of the light sensors in sub-second frequency so that the microcontroller can read the x- and y-positions and Lux value of each light sensor. The x, y, Lux data is then sent via the wireless or cloud-based network to a storage database or computing device for generation of the 2-dimensional light mapping data.

In addition to detecting luminance intensity in the x- and y-axes, it may be desirable to collect luminance intensity measurements along the z-axis as well (e.g., in order to generate 3-dimensional heatmaps). This can be accomplished by, for example, adjusting the distance of the light detection device in relation to the light sources. For indoor farms, the grow light sources are often attached to supports positioned above the grow plane. Therefore, in one embodiment, the light detection device may include one or more height adjustment members disposed or otherwise attached to the bottom surface of the support member or chassis for adjusting the height of the light detection device in relation to the grow light sources. The height adjustment members may include, for example, an automated stepper motor or scissor-jack for raising and lowering the light detection device. In other embodiments, the height of the light detection device can be adjusted manually using, e.g., a leg and hand crank system or screw adjustment system. Alternatively, legs of different heights that can be attached to the bottom surface of the light detection device. As such, the microcontroller can read the Lux data for each of the light sensors at multiple heights or distances from the grow light sources thereby generating serial x, y, z, Lux data that can then be sent via the wireless or cloud-based network to a storage database or computing device for generation of the 3-dimensional light mapping data.

As noted above, the light detection device will preferably be in communication with at least one computing device, which is enabled to run an application or computer program for converting Lux data to PPFD values for each x- and y-coordinates (and z-coordinates if the light detection device is used to take Lux measurements along the z-axis) and generating the heatmap. The light detection device can be communicably connected to one or more computing devices via ethernet cable or via a wireless network. In one embodiment, a user-operated computing device, such as a laptop or desktop is in communication with the light detection device by way of a local area network, wireless network, cloud-based network, or some combination thereof. Moreover, the user-operated computing device may be configured to run the application for converting the Lux values to PPFD and for generating the heatmap (i.e., as downloaded computer software). In other embodiments, the light mapping system includes a cloud-based network with a cloud-based computing device (i.e., cloud server) that runs the application, and which enables a user-operated computing device to display the resulting heatmap via a graphic user interface. Such cloud-based networking systems are known in the art and include, for example, software-as-a-surface, platform-as-a-service, infrastructure-as-a-service, or any combination thereof. Moreover, the light mapping system may be enabled to store Lux data or mapping information to one or more databases, which are in communication with the network.

An exemplary light mapping system is depicted in FIG. 1. The light mapping system 10 generally consists of a light detection device 15 that includes a support member or wiring chassis 20 on which is disposed a plurality of light sensors 25 for detecting light emitted from any number of grow light sources positioned above the top surface of the light detection device (not shown). While many different dimensions are possible with the present invention, the light detection device 15 shown in FIG. 1 is about 4 ft by 8 ft and generally planar. The light detection device 15 is electronically connected to a microcontroller 30 having built-in wireless 40 capabilities. The light detection device 15 gets its power from power source 35, which is a 6V battery in the embodiment depicted in FIG. 1. The light sensors 25 detect light having a spectral wavelength ranging from about 200 nm to about 1,200 nm, or more. In the exemplary embodiment depicted in FIG. 1, each of the light microcontroller 25 is a digital luminosity sensor that includes two photodiodes—one photodiode capable of detecting light having a spectral wavelength in the range from about 200 nm to about 1,200 nm, and a second photodiode capable of detecting light having a spectral wavelength in the range from about 500 nm to about 1,200 nm. Thus, the light sensors 25 can be configured for detecting light in any of the infrared, full-spectrum, and human-visible light electromagnetic spectrums.

Each light sensor 25 includes a clock pin and a data pin that can be electronically connected to a microcontroller 30 or other central processing unit (CPU). As such, the light sensors 25 can be configured for different gain/timing ranges to detect light ranging from about 0.1 Lux to about 40,000 Lux or more. The photodiodes are semiconductors (e.g., p-n junction) that convert light into electric current as light photons are absorbed by the photodiode. Suitable light sensors 25 are available in the art, for example, TSL2561 Luminosity Sensors (Adafruit Industries, New York, New York, USA). However, as one having ordinary skill in the art will appreciate, any of the light sensors discussed elsewhere herein are suitable for use with the light detection device. In addition, the light sensor array of the support member is covered by a protective, transparent polymer cover 22, such a thin plexiglass cover (poly (methyl methacrylate)) or other similar material. The light mapping system 10 communicates with a computing device 50 and a database (not shown), preferably, through a cloud-based network 45.

FIG. 2 depicts a view of the top surface 55 of the exemplary light detection device 15. This particular embodiment of the light detection device 15 comprises four sections, or rafts 60, each of which includes six columns of twelve light sensors 25 (i.e., 72 light sensors per raft). Therefore, the exemplary light detection device 15 has a total of 288 light sensors 25. It being understood that other combinations of rafts and numbers of light sensors are also possible in the invention. As noted above, each light sensor 25 is electronically connected to the microcontroller 30. Thus, each light sensor 25 will preferably have a corresponding hole 65 through which the connections are made to the microcontroller 30 disposed on the opposite surface of the support member (see FIG. 3B). FIG. 2B is an enlarged view of one section of the light detection device 15 showing the light sensors 25 and holes 65. As shown in FIG. 2C, each of the light sensors 25 can be assigned an x- and y-coordinate (e.g., 1,1 refers to column 1, row 1).

Figure 3A:
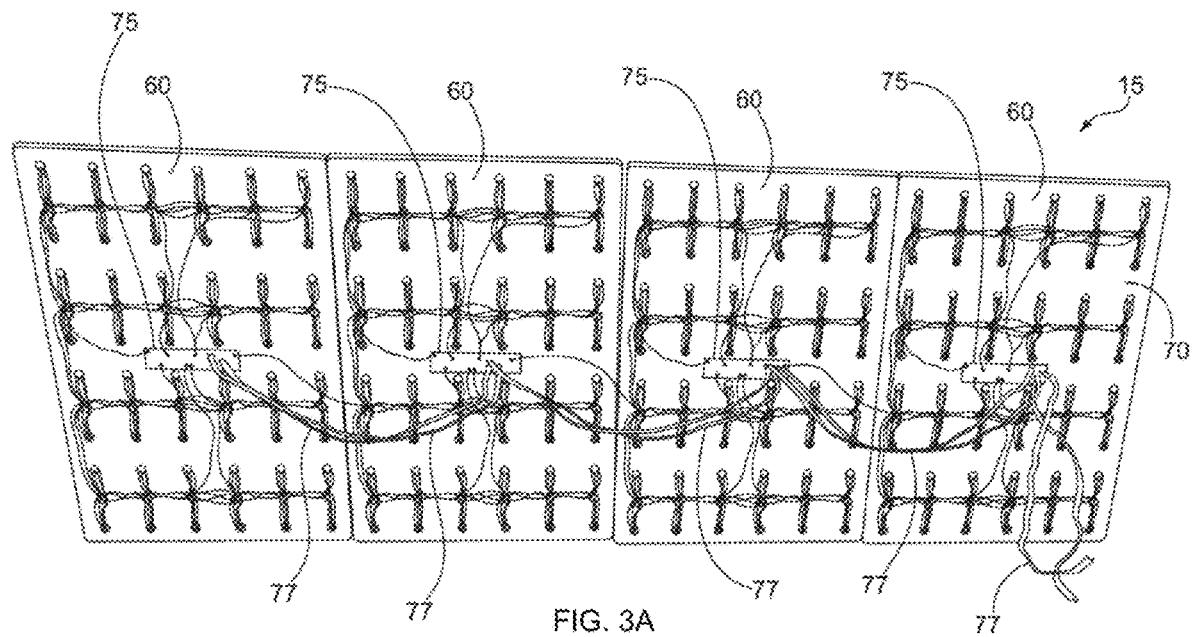
FIG. 3A is a bottom surface view of an exemplary light detection device. The signal routing circuit boards, or junctions are shown. In this particular embodiment, the multiplex junction (or multiplexer) and microcontroller are not shown, but are typically attached to the bottom surface of the last section on the right (see FIG. 3B).
Figure 3B:
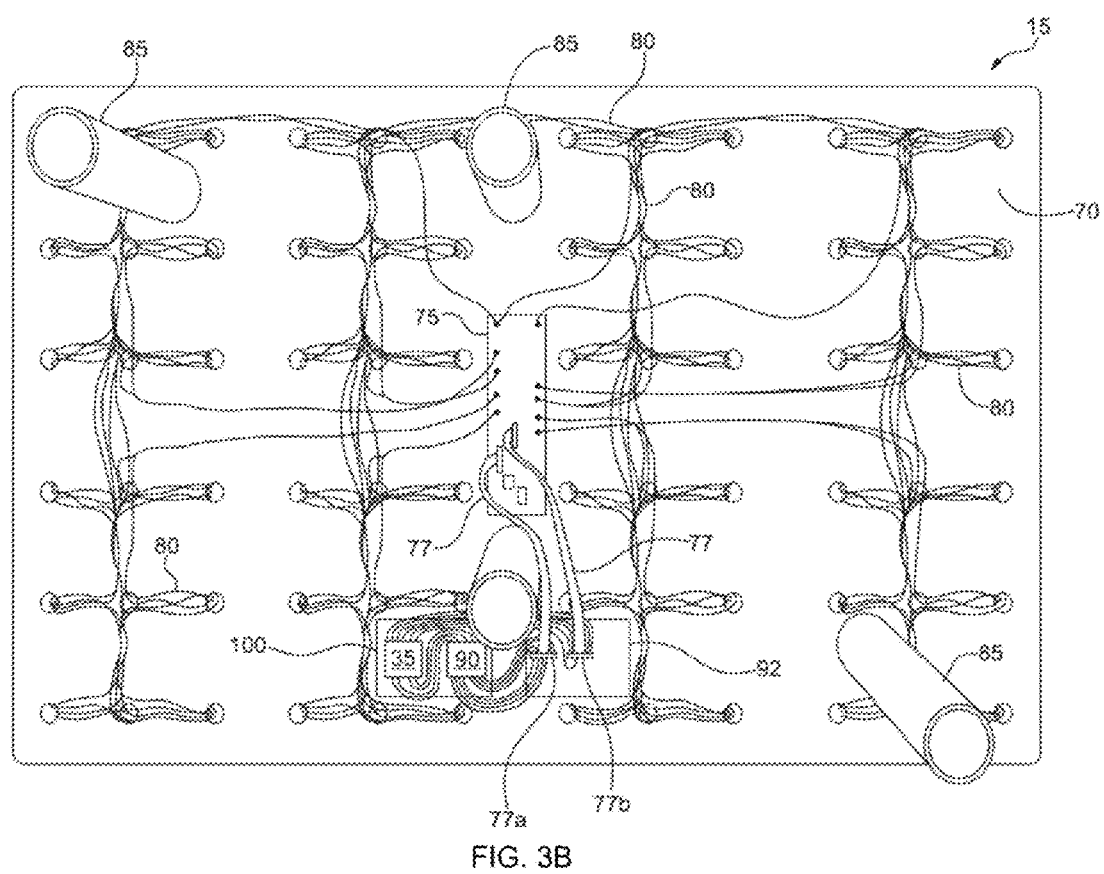
FIG. 3B is a bottom surface view of an exemplary Raft section showing the master control board containing the multiplex junction and microcontroller. Height adjustment supports are also shown.
Figure 4:
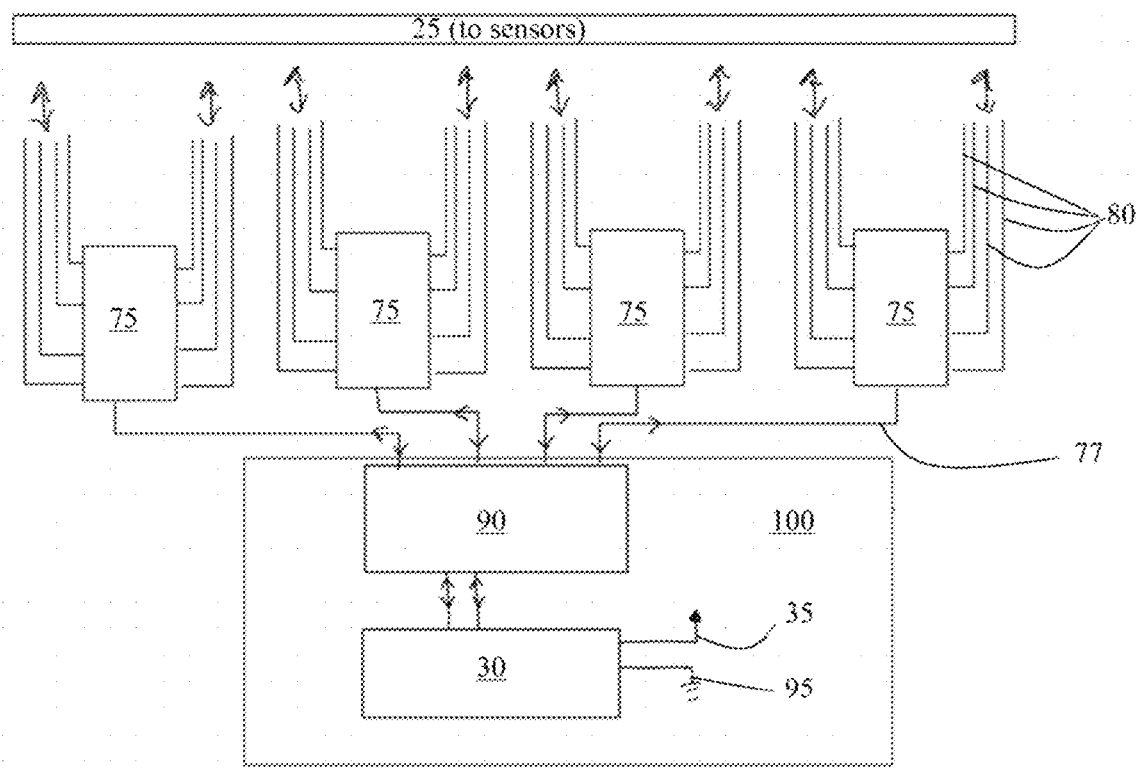
FIG. 4 is a diagram of an embodiment of the multiplex architecture.

In order to enable the light mapping system 10 to rapidly and continuously read each of the light sources 25 in real time with sub-second frequency, the light sensors 25 are connected to the microcontroller 30 via a multiplexing configuration as depicted in FIGS. 3 to 5. In this exemplary embodiment, the microcontroller 30 is a STM32 ARM Cortex M3 microcontroller that has four digital i/o ports and a built-in IoT Cypress wireless platform (Photon WiFi Development Board, Particle Industries, Inc., San Francisco, CA, USA). The multiplexing configuration enables the system to cycle through the four digital i/o ports of the microcontroller 30 to continuously read or measure the Lux values detected by all 288 light sensors 25 in sub-second frequency. In this particular multiplex configuration, the light sensors for each raft of the light detection device are electronically connected to a signal routing circuit board, or junction. Further, each of the junctions are routed to a multiplexing junction board and, ultimately, to the microcontroller.

As shown in FIG. 3A, each of the rafts 60 of the light detection device 15 includes one junction 75. The 72 lights sensors 25 of each raft 60 are connected to a single junction 75. The junctions 75 include a data ribbon connector and a common ribbon connector 77 on a soldered breadboard that is attached to the bottom surface 70 of the light detection device 15 using any suitable adhesive or attachment means. Each light sensor 25 includes a plurality of wires 80 that are routed from the light sensor 25, through the adjacent hole 65, and to the junction 75 on the corresponding raft 60 (see also FIG. 3B). Each of the junctions 75 are connected to each other via the ribbon connectors 77. As shown in FIG. 3B, the ribbon connectors 77 are routed to a data ribbon connector 77A and common ribbon connector 77B disposed on a ribbon connector board 92, which, in turn, are in electronic communication with the microcontroller 35 and multiplex junction 90 located on the PCB master control board 100, as will be explained in detail below. While this exemplary embodiment shows a separate ribbon connector board and master control board, the ribbon connectors are disposed on the PCB master control board in other embodiments. The microcontroller continuously reads or measures the Lux values of all 288 lights sensors 25 in sub-second frequency and sends the x- and y-position of the light sensors and corresponding Lux values (x, y, Lux) to the computing device or a database via the cloud-based network.

The light detection device 15 also includes several height adjustment members 85. In the embodiment shown in FIG. 3B, the height adjustment members 85 are made from PVC pipe. The height adjustment members 85 can be replaced with automated, adjustable height adjustment members to allow more rapid adjustment of the height of the light detection device 15. However, the particular embodiment of the light detection device 15 depicted in FIG. 3B is typically used for taking measurements in 2-dimensions at a desired height that is determined based on the particular plants being grown, or that will be grown, in the grow plane/area of interest and controlled by the length of the height adjustment members 85. As noted above, replacing the height adjustment members 85 with an automated or even manually-operated height adjustment members enables the light detection device 15 to be used for rapidly taking luminance measurements along the z-axis.

FIG. 4 depicts a diagram of the multiplexing architecture. Each of the four junctions 75 is connected to the sensors 25 on its corresponding raft, as well as the multiplex junction 90, which ultimately routes the sensor data to the microcontroller 30. The microcontroller 30 is connected to the power supply 35 (a ground pin 95 is also shown) and with the multiplex junction 90. The microcontroller 30 and multiplex junction 90 are shown together on a large solderless breadboard, which above is referred to as the PCB master control board 100. As discussed above, the microcontroller 30 communicates with a database for storage and/or a computing device 50 via its wireless IoT 40 in a cloud-based network 45. The Lux data and position from each of the sensors can be stored and or analyzed as described in more detail elsewhere herein.

Figure 5A:
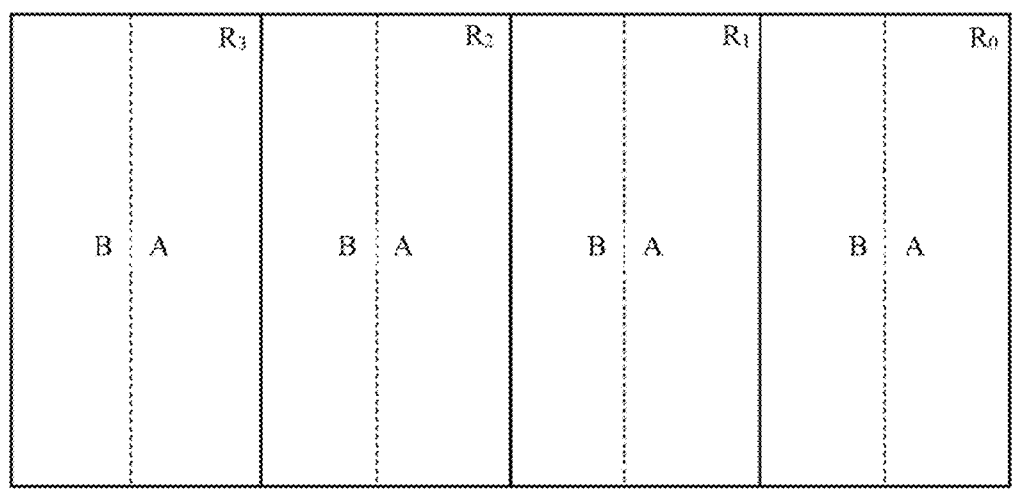
FIG. 5A is a diagram of a top view of an exemplary light detection device showing a designation of eight equal light sensor array sections $R_0A$ to $R_3B$. R is an abbreviation for Raft.
Figure 5B:
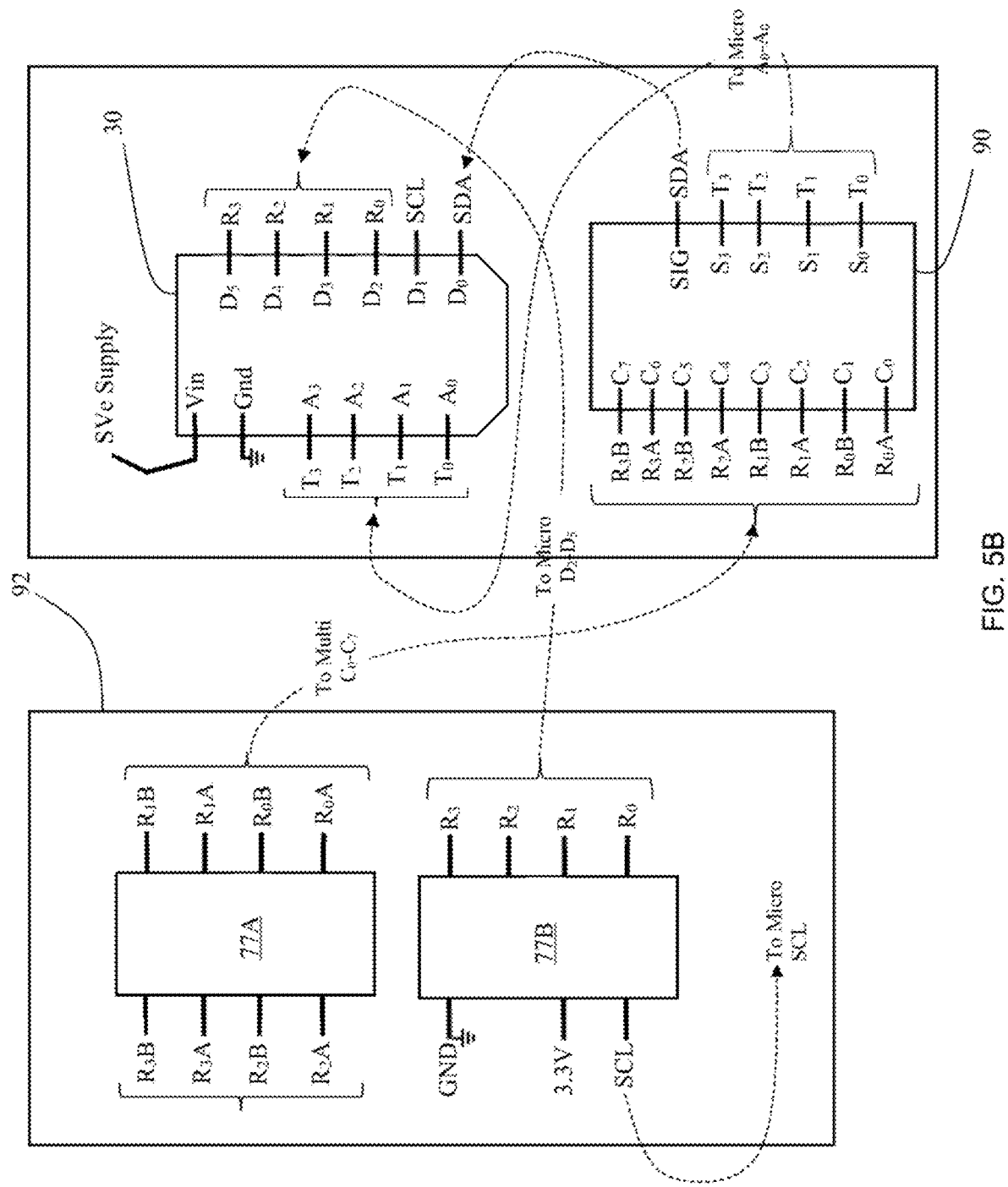

FIGS. 5A and 5B are diagrams illustrating the junction and microcontroller multiplexing architecture in more detail. As shown in FIG. 5A, the light detection device 15 may comprise four rafts labeled Raft 0 ($R_0$), Raft 1 ($R_1$), Raft 2 ($R_2$), and Raft 3 ($R_3$). Each of the rafts can be divided into two equal sections A and B, each of which holds 36 separate light sensors. The Lux data detected by each of these light sensors is routed to the junction. Therefore, each of the eight sets of light sensors can be given an identifier, i.e., $R_0A$, $R_0B$, $R_1A$, $R_1B$, $R_2A$, $R_2B$, $R_3A$, and $R_3B$. As shown in FIG. 5B, the data ribbon connector 77A connects each of $R_0A$, $R_0B$, $R_1A$, $R_1B$, $R_2A$, $R_2B$, $R_3A$, and $R_3B$ to one of 8 corresponding common channel pins $C_0$-$C_7$ of the multiplex junction 90. The serial clock line data (SCL) from common ribbon connector 77B is connected to digital pin $D_1$ on the microcontroller 30. The SIG-pin of the multiplex junction 90 connects any of the $C_0$-$C_7$ common data channels to digital pin $D_0$ of the microcontroller 35. The control or switch pins $S_0$-$S_3$ control which of the common channels $C_0$-$C_7$ is connected to the SIG pin at any given time. The switch pins, in turn, are connected to their counterpart analog pins $A_0$-$A_3$ of the microcontroller via timers $T_0$-$T_3$, respectively. Finally, $R_0$-$R_3$ (corresponding to $Raft_0$-$Raft_3$, respectively) are connected to the digital i/o pins $D_2$-$D_5$, respectively, of the microcontroller 30. Thus, the multiplex junction 90 enables the microcontroller 30 to cycle through the Lux readings of all 288 light sensors in the correct order, and in sub-second frequency. It being understood that the multiplex architecture depicted in FIG. 5B can be modified to include multiplex junctions with more or less than 8 channels, e.g., 2, 3, 4, 5, 6, 7, 8, 9, 10, 11, 12, 13, 14, 15, 16, 17, 18, 19, 20, or more and/or to include a microcontroller with more or less than 4 i/o ports, e.g., 2, 3, 4, 5, 6, 7, 8, 9, 10 or more. Thus, the multiplex architecture described in FIGS. 3-5 is only one example of a suitable multiplex configuration. Multiplex junction and microcontroller functionality are well within the purview of one having ordinary skill in the art. As such, many additional multiplex architecture configurations can be suitable for use with the present invention using the guidance provided by the illustrations depicted in FIGS. 3-5.

The multiplex junction and microcontroller architecture enables the microcontroller to cycle through each light sensor with sub-second frequency to measure the Lux values at each distinct position in real-time. Thus, the light detection device of the instant invention can cycle through at least about 100 light sensors to measure the Lux values at each distinct position in less than about 5 s, e.g., 5, 4, 3, 2, 1 seconds. Preferably, the light detection device can cycle through at least about 250 light sensors to measure the Lux values at each distinct position in less than about 5 s, e.g., 5, 4, 3, 2, 1 seconds. More preferably, the light detection device can cycle through at least about 250 light sensors to measure the Lux values at each distinct position in less than about 2 seconds (less than about 2 Hz); even more preferably, in less than about 1 second (less that about 1 Hz). For instance, the light detection device with multiplex architecture depicted in FIGS. 1-5 can cycle through 288 light sensors in less than about 1 second (less than about 1 Hz). In other words, the light detection device can cycle through the entire array of light sensors at less than about a 2 Hz sampling rate, e.g., 2 Hz, 1.9 Hz, 1.8 Hz, 1.7 Hz, 1.6 Hz, 1.5 Hz, 1.4 Hz, 1.3 Hz, 1.2 Hz, 1.1 Hz, 1.0 Hz, 0.9 Hz. Preferably, the light detection device can cycle through the entire array of light sensors at less than about a 1 Hz sampling rate. Thus, the Lux data for all light sensor positions can be obtained in real-time.

Light Mapping System

Figure 6:
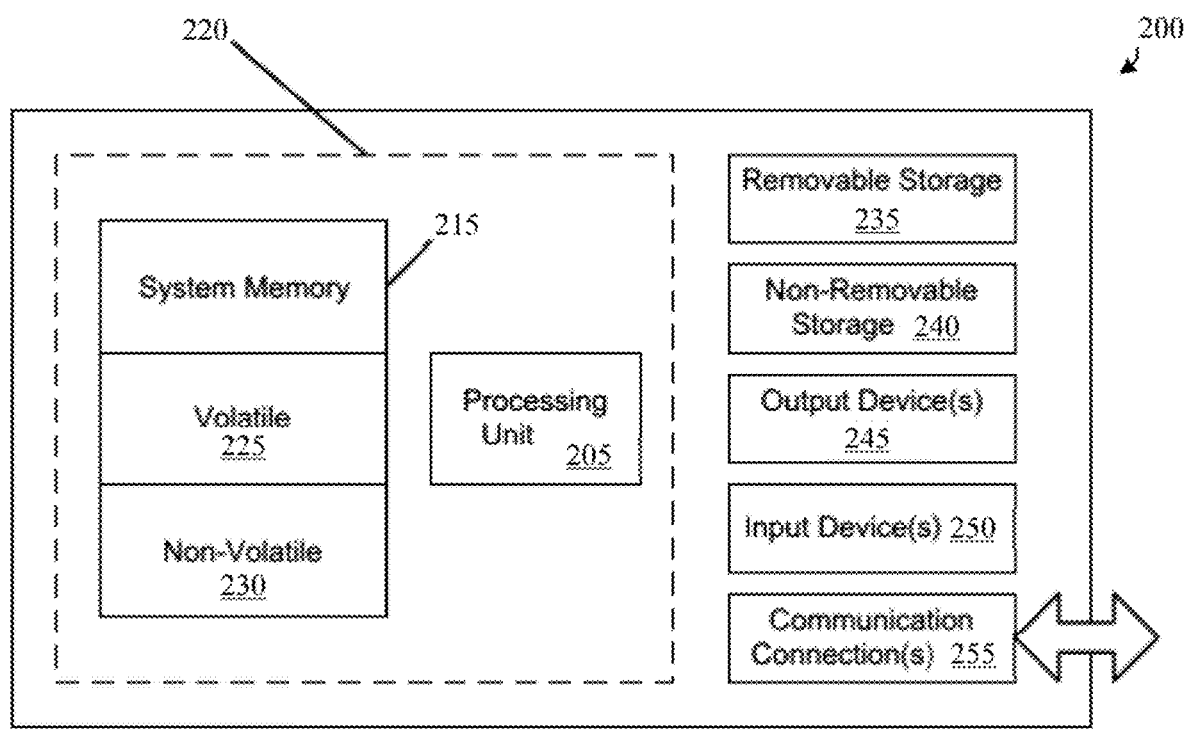
FIG. 6 shows an exemplary computing environment in which example embodiments and aspects may be implemented.

As noted above, the light mapping system 10 depicted in FIG. 1 includes at least one user computing device 50. The user computing device 50 can be any general purpose computing device known in the art. For example, FIG. 6 depicts an exemplary computing device in which example embodiments and aspects of the light mapping system may be implemented. The computing device environment is only one example of a suitable computing environment, and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules or applications, being executed by a computer may be used. Generally, program modules or applications include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 200. In its most basic configuration, computing device 200 typically includes at least one processing unit 205 and memory 215. Depending on the exact configuration and type of computing device, memory 215 may be volatile 225 (such as random-access memory (RAM)), non-volatile 230 (such as read-only memory (ROM), flash memory, etc.), or some combination of the two. This most basic configuration is illustrated in FIG. 6 by dashed line 220.

Computing device 200 may have additional features/functionality. For example, computing device 200 may include additional storage (removable and/or non-removable) including, but not limited to, magnetic or optical disks or tape. Such additional storage is illustrated in FIG. 6 by removable storage 235 and non-removable storage 240.

Computing device 200 typically includes a variety of computer readable media. Computer readable media can be any available media that can be accessed by the device 200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 215, removable storage 240, and non-removable storage 240 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of computing device 200.

Computing device 200 may contain communication connection(s) 255 that allow the device to communicate with other devices. Computing device 200 may also have input device(s) 250 such as a keyboard, mouse, pen, voice input device, touch input device, etc. Output device(s) 245 such as a display, speakers, printer, etc. may also be included. All of these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

In one embodiment, the microcontroller 30 will send the Lux data to a database or to the computing device 50 via the network 45. As noted above, the network 45 can be a cloud-based network, a local area network, a Bluetooth network, a cellular or mobile network, the internet, or any combination of such networks. In a preferred embodiment, the network 45 is a cloud-based network, and the microcontroller 30 will first send the Lux data to a database or cloud-based computing device (i.e., cloud server) running the computer application for converting Lux into PPFD and generating the heatmap. The microcontroller CPU includes instructions causing the microcontroller to take each light sensor Lux reading in a sub-section of the full configuration of the light detection device light sensor array, and combine the data into larger sections, which is then passed to the network in a logical format. For instance, the exemplary light detector device depicted in FIG. 2 includes four sections or rafts that include a total of 288 light sensors, with each raft containing 72 light sensors, which can be described as the following:

```
+--------------------------------------+
| RAFT3 RAFT2 RAFT1 RAFT0 |
| RAFT3 RAFT2 RAFT1 RAFT0 |
| RAFT3 RAFT2 RAFT1 RAFT0 |
| RAFT3 RAFT2 RAFT1 RAFT0 |
+--------------------------------------+
```

Each Raft holds six columns of twelve sensors:

```
+-------------+
|....M A|
|....N B|
|....O C|
|....P D|
|....Q E|
|.....F|
|.....G|
|.....H|
|.....I|
|.....J|
|.....K|
|.....L|
+-------------+
```

Thus, light sensor A in Raft 0 is the first value in the data string, which proceeds from top to bottom, and from right to left thereafter. The reading of the Lux values can be described as a series of steps. First, the microcontroller cycles through each pin of each junction until all 288 light sensor Lux values are read. Next, the readings from the sensors are combined onto a single data string and encoded to reduce the size of the data string to be sent as a message to the network server, which preferably is a cloud-based network server. Once the network server receives this message, it decodes the string and displays or stores the values in a map of position and Lux value (x, y, Lux). The light mapper application then converts the Lux values to PPFD values and displays each PPFD value as a heat map intensity according to the x- and y-coordinates to produce a 2-dimensional heatmap. Converting Lux values to PPFD is accomplished by multiplying a conversion factor that is unique to the spectrum of light being measured according to equation 1:

$$PPFD = m*Lux + \beta \qquad \text{Equation 1}$$

where m is the conversion factor that is unique to the lights being measured, and $\beta$ is a constant offset based off of a zero intensity measurement. The conversion factor m can be obtained using literature available in the art or the manufacturer's specification for a particular grow light. For example, sunlight has an m factor of about 0.0185, whereas a certain fluorescent agro light source may have an m factor of about 0.0172. Next, starting with 0% light intensity, a handheld or other art-standard PAR meter device is used to measure PPFD at a single point. Then, the Lux value at that point is read using the light detector. This process is repeated at discrete intervals that increase the light intensity by 10% each interval. The PPFD and PAR pairs are plotted on a linear regression graph, and the linear relationship is calculated between the data sets. The linear scale factor is used as the conversion factor a from Lux to PPFD according to Equation 2:

$$PPFD = Lux*\alpha + \beta \qquad \text{Equation 2}$$

Figure 7:
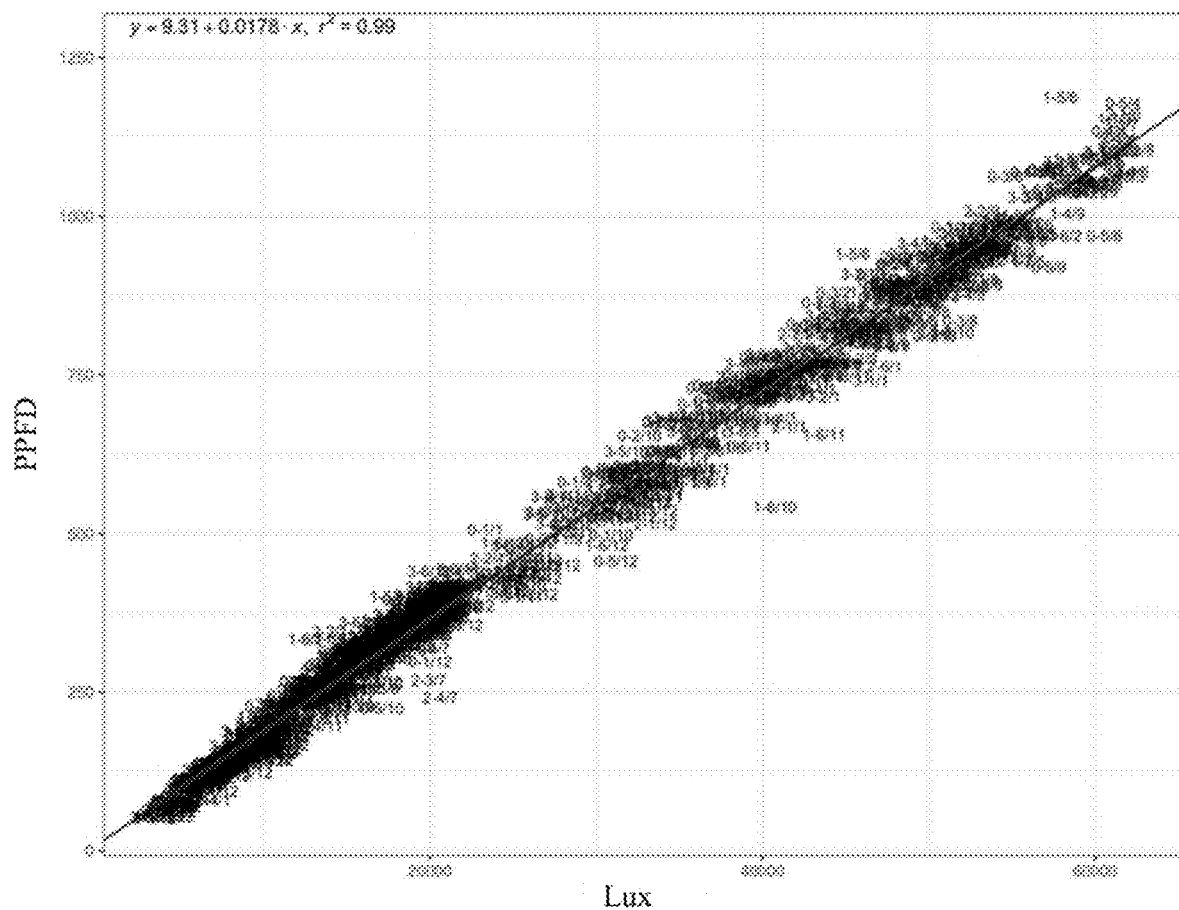
FIG. 7 is an exemplary linear regression plot showing the linear relationship between PPFD values (y-axis) and Lux values (x-axis) used to determine the Lux to PPFD conversion factors.

FIG. 7 depicts an exemplary linear relationship used to solve for the conversion factors $\alpha$ and $\beta$, where conversion factor $\alpha$ is calculated as 9.31, and conversion factor $\beta$ is calculated as 0.0178. The heatmap visualization application software then creates the heatmap with a combination of HTML, and JavaScript on the front end.

Figure 8:
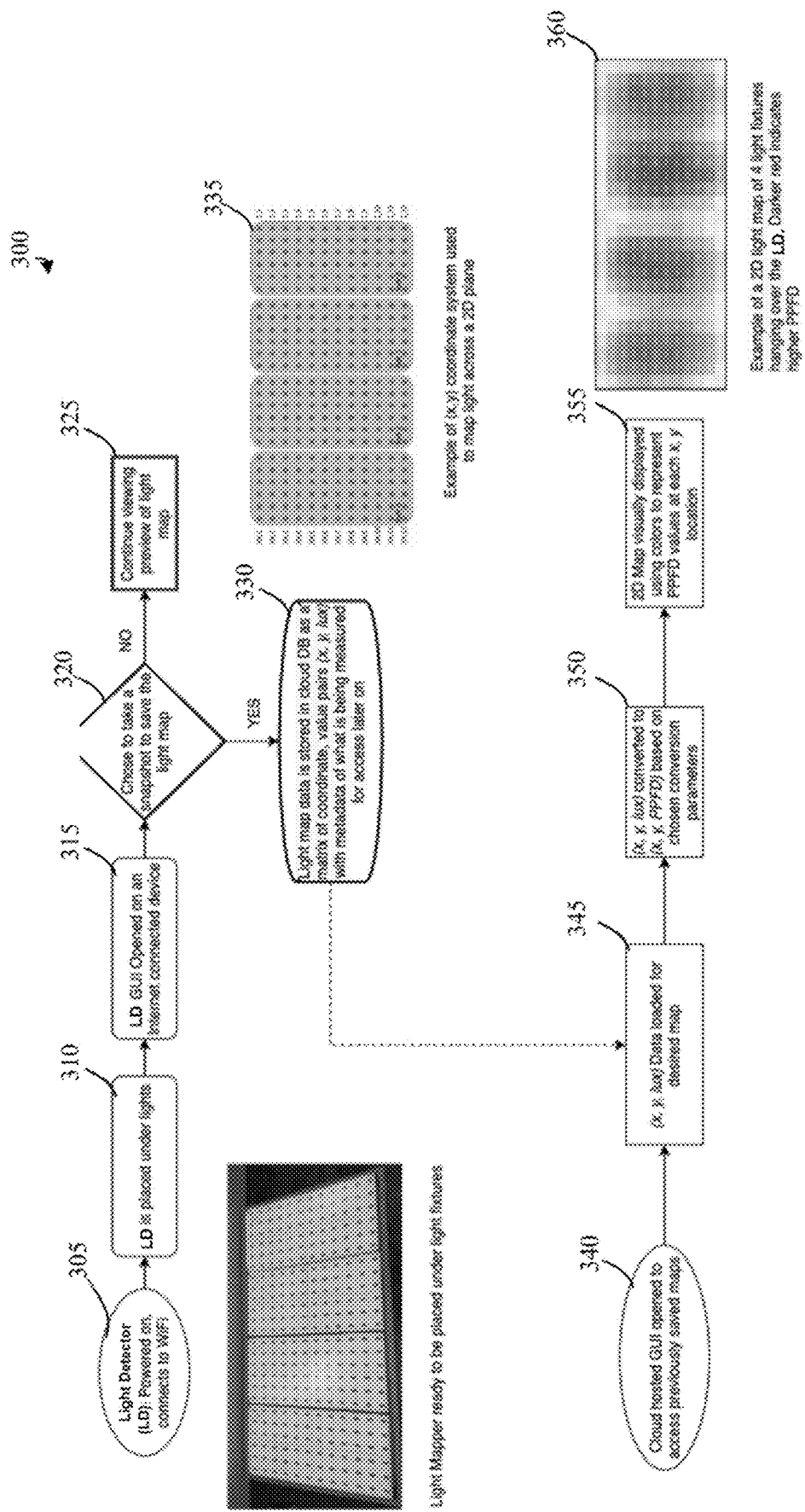
FIG. 8 is a flow chart of an embodiment of the light mapping system software program.

FIG. 8 depicts a flow chart showing an exemplary light mapping system process. The light mapping process 300 begins as the light detection device is turned on 305 and placed under the grow lights 310 and within the grow plane by the user. The light mapping system graphic user interface (GUI) is opened on an internet-connected device 315, such as the computing device 50, to connect with the cloud-based network of the light mapping system. The user can choose to take a snapshot to save the lightmap 320 in the cloud database 330, or continue viewing in real-time 325. The data string from the microcontroller is decoded and loaded as x, y, Lux values 345, and the Lux values are then converted to PPFD by the system software 350 according to the equations described above. The 2-dimensional map is then displayed via the GUI 355 typically using colors to indicate high versus low intensity in the resulting lightmap 360 (e.g., red to orange to yellow to green as highest to lowest luminance intensity). Each square in the heatmap 360 corresponds to an x- and y-position whereas the intensity is the converted PPFD value (from Lux) for that position. Often the heatmap will display a numeric value within the colored square (see, for example, FIGS. 9A and 9B). The user can also open a previously saved x, y, Lux map from the cloud-based database 340 and display the resulting PPFD heatmap. The heatmap can then be used to determine low or high intensity luminance areas within the grow plane and either adjust the position of the plants within that grow plane, or adjust the position and/or intensity of the grow lights.

As noted above, the light detection device can cycle through the entire array of light sensors at less than about a 2 Hz sampling rate; preferably, less than about a 1 Hz sampling rate. The user of the light mapping system, therefore, can visualize a heatmap that depicts PPFD values in real time.

Figure 9A:
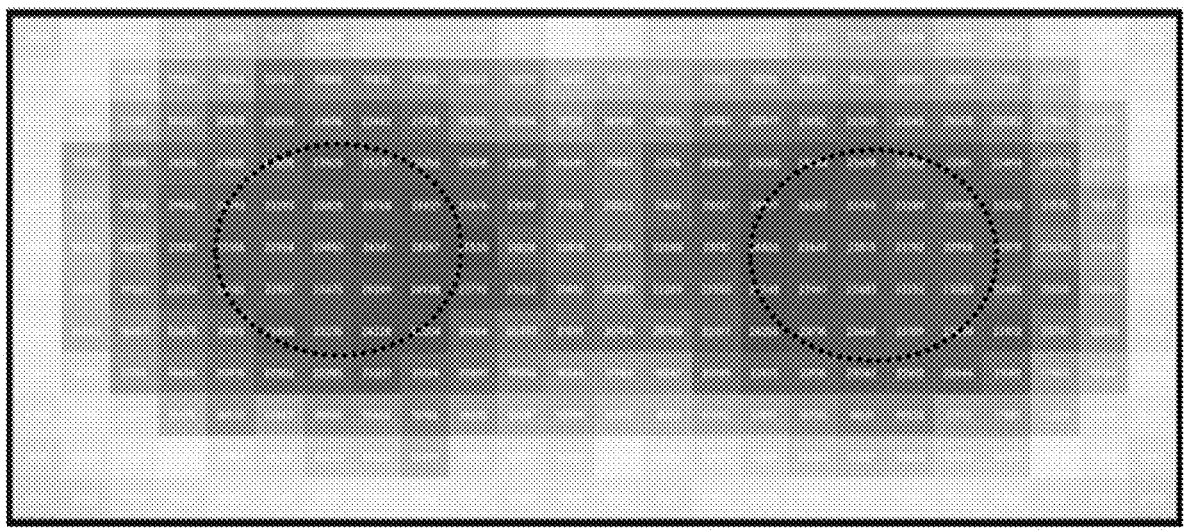
FIG. 9A is an exemplary heatmap showing the distribution of PPFD intensity as converted from Lux measurements taken from 288 light sensors. The dotted circles indicate the position of the grow lights. The darker squares indicate higher PPFD intensity, whereas the lighter squares indicate lower PPFD intensity.
Figure 9B:
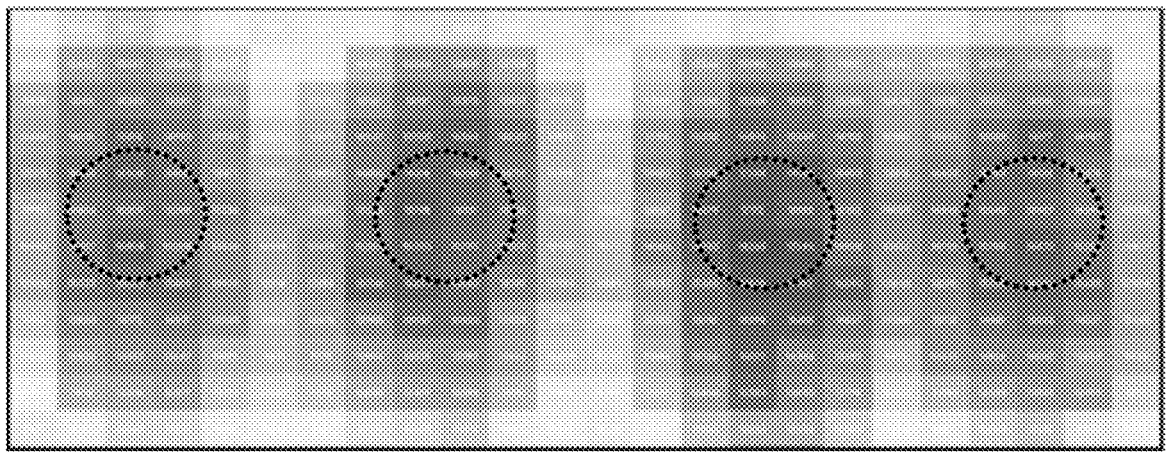
FIG. 9B is an exemplary heatmap showing the distribution of PPFD intensity as converted from Lux measurements taken from 288 light sensors. The dotted circles indicate the position of the grow lights. The darker squares indicate higher PPFD intensity, whereas the lighter squares indicate lower PPFD intensity.

FIGS. 9A and 9B show additional exemplary heatmaps representing converted Lux to PPFD values for 288 distinct light sensors. The darker areas indicate higher intensity luminance as compared to the lighter areas. The numeric values are indicated within each square. The top right corner corresponds to Raft 0, light sensor at position x=1, y=1, while the bottom right corresponds to Raft 3, light sensor at position x=24, y=12. As can be discerned from the PPFD intensity pattern, there are two grow lights in FIG. 9A roughly equidistant from each other (see FIG. 9A, dotted circles). Thus, the area of the grow plane between the two lights has a PPFD intensity that is less than the area of the grow plane directly beneath the grow lights. Furthermore, the areas around the edges of the heatmap have the least PPFD intensity. In FIG. 9B, there are four grow lights roughly equidistant from each other (see dotted circles). Thus, this information can be used by the grower to determine how to adjust the position of the grow lights and/or where to place the growing plants to ensure the greatest uniformity and amount of luminance exposure to the plants and, therefore, optimize plant growth. For instance, the user can view the heatmap in FIG. 9B and determine that the position of the two grow lights on the left can be adjusted to provide less PPFD intensity gaps between the lights as compared to the PPFD intensity distribution shown by the two grow lights on the right, which have a slightly higher PPFD intensity between them. In this way, the grow lights can provide a more uniform light distribution to ensure that all plants in the grow plane receive sufficient light.

While the exemplary embodiments depicted herein show 2-dimensional heatmaps corresponding to PPFD intensity, by adjusting the distance of the light detector device from the grow lights (e.g., changing the height of the light detector device when the grow lights are positioned above where plants will be grown), the present light mapping system can be used to read Lux values at the x, y, and z positions to assemble a 3-dimensional heatmap of PPFD intensity. The grower can use this information to raise and lower the plant bed to ensure the greatest uniformity and amount of luminance exposure to the plants.

Methods of Use of the Light Mapping System

Also presented herein are methods of using the light mapping system of the disclosure to determine the light intensity across a grow plane for a given set of grow lights. For instance, in a typical indoor or vertical farm, plants are grown in a bin or other similar structure in which soil or water (i.e., hydroponics) is disposed for provision of nutrients to the plants. In addition, as these plants are not typically exposed to direct sunlight, these indoor farms will include artificial light sources (referred to as "grow lights") that are affixed to support structures to position the grow lights above the grow plane where the plants will be grown. In such an arrangement, the grow lights will be configured or angled to emit light towards the grow plane. As light is emitted from the grow lights to the plants, the plants utilize the light photons emitted from the grow lights in photosynthesis to produce energy necessary for growth. Grow lights suitable for use in indoor farms are readily available in the art (e.g., incandescent bulbs, fluorescent lamps, high intensity discharge lamps, light emitting diodes (LEDs), and the like) and tend to emit light having a spectral wavelength from about 200 nm to about 800 nm; preferably from about 300 nm to about 700 nm. However, the plants furthest away from the grow lights will tend to get less luminance and, thus, grow more slowly as compared to plants closest to the grow lights. As such, plants in the center of the grow plane can grow up to twice the mass as plants growing towards the outer edges of the grow plane in the grow bed (for example, the outer edges of the light maps in FIGS. 9A and 9B show much less luminance intensity as compared to the center portions). The grower can use the light intensity distribution information provided by the present light mapping system to best position the plants and/or grow lights to ensure the most optimal growth of all of the plants in the grow bed.

Thus, in an embodiment, a method of measuring light intensity emitted to a grow bed or grow plane is provided. The method includes providing a grow bed in, or grow plane on which plants will be grown, and one or more light sources affixed to a structure (e.g., a vertical support, lateral support, ceiling, or other structure) to position the light sources toward the grow bed so they emit light towards the grow plane. The position or angle of each of the light sources will preferably be adjustable so that they can be adjusted from a first position to a second position. For example, when in the second position, the light source distributes light more uniformly across the grow plane as compared to the first position of the light source. The grow bed can be a bin or other similar structure as part of an indoor or vertical farm. The plants can be any plants known in the art or discovered in the future that have above-ground plant canopies and that utilize sunlight for photosynthesis such as, but not limited to, asparagus, barley, beans, beets, blueberries, broccoli, cabbage, canola, cauliflower, celery, cranberries, corn, cotton, feed grains, flowers, garlic, grapes, lentils, lettuce, marijuana, oats, peanuts, peas, peppers, potatoes, pumpkins, rice, sorghum, soybeans, spinach, squash, strawberries, sugar cane, sweet potatoes, tobacco, tomatoes, turnips, watermelon, wheat, and the like.

The method includes disposing or placing the light detection device within the grow plane with its top surface and light sensor array facing the light sources, with each light source in the first position. The user then uses the light mapping system and light detection device to detect the Lux values at a plurality of positions within the grow plane. The plurality of positions within the grow plane can include the x- and y-positions or the x-, y-, and z-positions. The light mapping system then converts the Lux values at each light sensor position to PPFD values and generates a heatmap of the luminance intensity distribution across the grow plane as explained above.

If the heatmap indicates that there are areas of the grow plane with low PPFD intensity, the user can then adjust the position of one or more of the light sources to the second position and repeat the process. If the resulting heatmap indicates that adjusting the position of the one or more light sources to the second position produces a more uniform PPFD intensity distribution (i.e., the area of the grow plane with the low PPFD intensity as indicated by the initial heatmap now has higher PPFD intensity), the user can remove the light detector device and place the grow bin containing the plants to be grown into the grow plane. On the other hand, if the resulting heatmap indicates that there areas of the grow plane that still have low PPFD intensity, the user can adjust the one or more light sources to a third position, and so on.

Alternatively, the user can use the heatmap information to arrange the plants in the grow bed such that all plants in the grow bed will only be grown in those areas of the grow plane that are exposed to high PPFD intensity. For instance, if the heatmap similar to that shown in FIG. 9A were obtained, the user may take care not to plant seedlings around the outside of the grow bed or in the middle of the grow bed corresponding to the area between the two light sources.

Thus, the grower can utilize the light detection device and system of the invention to position the grow lights and/or the growing plants to achieve optimal luminance distribution across the grow plane for ensuring maximal plant growth among all plants in the grow plane.

REFERENCE NUMBERS FOR LIGHT MAPPING SYSTEM FEATURES

10—light mapping system
15—light detection device
20—support member/wiring chassis
22—transparent cover
25—light Sensors
30—microcontroller
35—power supply
40—built-in wireless
45—cloud network
50—computing device
55—top surface of the light detection device
60—raft
65—hole
70—bottom surface of the light detection device
75—junctions
77—ribbon connectors
77—data ribbon connector
77—common ribbon connector
80—wires
85—height supports
90—multiplex junction
92—ribbon connector board
95—ground
100—PCB master control board The following examples are provided to describe the invention in greater detail. They are intended to illustrate, not to limit, the invention.

We claim:

1. A light detection system comprising a light detection device in communication with a first computing device, the first computing device comprising an application and the light detection device comprising:
   a support member having a top surface and a bottom surface;
   a plurality of light sensors disposed on the top surface of the support member;
   a controller; and
   two or more signal routing circuits, wherein each signal routing circuit is electrically connected to a portion of the plurality of the light sensors and further electrically connected to an input on the controller, wherein each portion of the plurality of the light sensors comprises multiple light sensors;
   wherein:
   the plurality of light sensors are electrically connected to the controller, wherein each light source comprises a location position and is configured for detection of luminance within a grow plane, the luminance comprising light having a spectral wavelength in the range from about 100 nm to about 1,200 nm and which is emitted from one or more light sources, and wherein the detection comprises a first light value;
   the controller is configured to read the first light value and the location position from each of the light sensors, wherein the controller is further configured to read the first light value and location position from the plurality of light sensors at less than about a 2 Hz sampling rate, and wherein the controller combines the first light value and location position from each of the light sensors on a single data string and sends the single data string to the first computing device; and
   the application of the first computing device converts the first light value from each of the light sensors to a second light value and arranges the second light values by location positions of the light sensors in at least 2-dimensions.

2. The light detection system of claim 1, wherein the controller is further configured to read the first light value and location position from the plurality of light sensors at less than about a 1 Hz sampling rate.

3. The light detection system of claim 1, wherein the first computing device is a cloud-based server running the application.

4. The light detection system of claim 1, wherein:
   a) either the first computing device or a second computing device receives instructions from the application to display a heatmap comprising the second light values; or
   b) one or more databases in communication with the controller and the first computing device, wherein the one or more databases are configured for storing the second light values arranged by location positions of the light sensors in at least 2-dimensions; or
   c) both a) and b).

5. The light detection system of claim 1, wherein the location positions of each of the light sensors comprises an x-position and a y-position.

6. The light detection system of claim 1, wherein the light detection device comprises one or more height adjustment members attached to the bottom surface of the support member and configured for adjusting the height of the light detection device from a first height position to a second height position.

7. The light detection system of claim 1, wherein the locations positions of each of the light sensors comprises an x-position, a y-position, and a z-position, and wherein the application of the first computing device arranges the second light values by location positions of the light sensors in 3-dimensions.

8. The light detection system of claim 1, wherein the first light value is Lux; wherein the second light value is photosynthetic photon flux density ("PPFD"), and
   wherein the application converts the Lux values from each light sensor to PPFD according to equation:
   (a) PPFD=m*Lux+β; or
   (b) PPFD=Lux*α+β; or
   both (a) and (b) (c)
   wherein:
   m is a conversion factor for each of the one or more light sources;
   β is a constant offset based off of a zero intensity measurement;
   α and β are conversion factors determined by a linear scale factor; and
   Lux is illuminance intensity.

9. The light detection system of claim 1, further comprising at least 100 light sensors disposed on the top surface of the support member.

10. The light detection system of claim 1, further comprising a multiplexer electrically connected to each of the signal routing circuits and electrically connected to the controller.

11. The light detection system of claim 1, further comprising at least four signal routing circuits.

12. The light detection system of claim 1, wherein each light sensor is configured for detection of luminance within a grow plane, the luminance comprising light having a spectral wavelength from about 300 nm to about 700 nm.

13. A method of measuring luminance intensity within a grow plane, the method comprising:
   (a) providing a grow plane in which plants are currently being grown or that will be grown, wherein at least one light source in a first position emits light to the grow plane;
   (b) providing the light detection system of claim 1;
   (c) placing the light detection device of the light detection system within the grow plane with the top surface of the support member facing the at least one light source; and
   (d) measuring luminance distribution in the grow plane, wherein the measuring comprises a heatmap of luminance intensity distribution across the grow plane in at least 2-dimensions.

14. The method of claim 13, further comprising the step of moving the at least one light source from the first position to a second position, wherein the at least one light source in the second position emits light having a luminance distribution in the grow plane that is more evenly distributed than when the at least one light source is in the first position.

15. The method of claim 13, further comprising determining positions in the grow plane with a first luminance intensity according to the heatmap, and positions in the grow plane with a second luminance intensity according to the heatmap, wherein the first luminance intensity is greater than the second luminance intensity.

16. The method of claim 15, further comprising the step of placing the plants in the positions in the grow plane with the first luminance intensity.

17. The method of claim 13, further comprising the step of:
   (e) moving the light detection device to a different position in a z-axis and repeating the measuring step; and
   wherein the measuring comprises a heatmap of luminance intensity distribution across the grow plane in 3-dimensions.

18. The method of claim 13, wherein the plants are selected from the group consisting of asparagus, barley, beans, beets, blueberries, broccoli, cabbage, canola, cauliflower, celery, cranberries, corn, cotton, feed grains, flowers, garlic, grapes, lentils, lettuce, marijuana, oats, peanuts, peas, peppers, potatoes, pumpkins, rice, sorghum, soybeans, spinach, squash, strawberries, sugar cane, sweet potatoes, tobacco, tomatoes, turnips, watermelon, wheat, and any combination thereof.

19. The method of claim 13, wherein the grow plane is part of an indoor farm.

20. A light detection device comprising:
   a support member having a top surface and a bottom surface;
   a plurality of light sensors disposed on the top surface of the support member;
   a multiplexer;
   a microcontroller; and
   two or more signal routing circuits, wherein each signal routing circuit is electrically connected to a portion of the plurality of the light sensors and further electrically connected to the multiplexer, wherein each portion of the plurality of the light sensors comprises multiple light sensors;
   wherein:
   the multiplexer is electrically connected to each of the signal routing circuits and electrically connected to the microcontroller;
   each light source comprises a location position and is configured for detection of luminance within a grow plane, the luminance comprising light having a spectral wavelength in the range from about 100 nm to about 1,200 nm and which is emitted from one or more light sources, and wherein the detection comprises a first light value; and
   the microcontroller is configured to read the first light value and the location position from each of the light sensors, wherein the controller is further configured to read the first light value and location position from the plurality of light sensors at less than about a 1 Hz sampling rate, and wherein the microcontroller is further configured to combine the first light value and location position from each of the light sensors on a single data string and send the single data string to at least one computing device.

21. The light detection device of claim 20, wherein the at least one computing device comprises an application for converting the first light value from each of the light sensors to a second light value and arranging the second light values by location positions of the light sensors in at least 2-dimensions.

22. The light detection device of claim 20, further comprising at least four signal routing circuits, wherein the support member comprises at least four Rafts, and wherein each Raft comprises at least one signal routing circuit.

23. The light detection device of claim 20, wherein either the first computing device or a second computing device receives instructions from the application to display a heatmap comprising the second light values.

24. The light detection device of claim 21, wherein the first light value is Lux, wherein the second light value is photosynthetic photon flux density ("PPFD"), and wherein the application converts the Lux values from each light sensor to PPFD according to equation:
(a) $PPFD = m*Lux + \beta$; or
(b) $PPFD = Lux*\alpha + \beta$; or
(c) both (a) and (b)

wherein:

m is a conversion factor for each of the one or more light sources;

$\beta$ is a constant offset based off of a zero intensity measurement;

$\alpha$ and $\beta$ are conversion factors determined by a linear scale factor; and Lux is illuminance intensity.

* * * * *